United States Patent
Shrauger et al.

(10) Patent No.: US 10,655,992 B2
(45) Date of Patent: May 19, 2020

(54) ANEMOMETER

(71) Applicant: Dwyer Instruments, Inc., Michigan City, IN (US)

(72) Inventors: Vernon Eugene Shrauger, Cambridge, MA (US); Jacob van Reenen Pretorius, Somerville, MA (US)

(73) Assignee: DWYER INSTRUMENTS, INC., Michigan City, IN (US)

( * ) Notice: Subject to any disclaimer, the term of this patent is extended or adjusted under 35 U.S.C. 154(b) by 0 days.

(21) Appl. No.: 15/394,083

(22) Filed: Dec. 29, 2016

(65) Prior Publication Data

US 2017/0248627 A1    Aug. 31, 2017

Related U.S. Application Data (60) Provisional application No. 62/299,685, filed on Feb. 25, 2016.

(51) Int. Cl.
*G01F 1/684* (2006.01)
*G01P 5/10* (2006.01)
*G01P 5/12* (2006.01)

(52) U.S. Cl.
CPC ............... *G01F 1/684* (2013.01); *G01P 5/10* (2013.01); *G01P 5/12* (2013.01)

(58) Field of Classification Search
CPC ............... G01F 1/684; G01P 5/10; G01P 5/12
See application file for complete search history.

(56) References Cited

U.S. PATENT DOCUMENTS

| | | | | |
|---|---|---|---|---|
| 4,220,950 A | | 9/1980 | Clark et al. | |
| 4,425,792 A | * | 1/1984 | Kohama | G01F 1/69 73/204.27 |
| 4,594,889 A | * | 6/1986 | McCarthy | G01F 1/6845 73/204.26 |
| 4,776,214 A | * | 10/1988 | Moran | G01F 1/684 73/202 |
| 4,986,122 A | * | 1/1991 | Gust | E21B 21/08 73/1.29 |

(Continued)

FOREIGN PATENT DOCUMENTS

| | | |
|---|---|---|
| DE | 102014202105 | 8/2015 |
| EP | 2592425 | 5/2013 |
| JP | 09145440 | 6/1997 |

OTHER PUBLICATIONS

International Search Report corresponding to International Application No. PCT/US2016/069224, dated Apr. 20, 2017, 17 pages.

*Primary Examiner* — Justin N Olamit
(74) *Attorney, Agent, or Firm* — Tarolli, Sundheim, Covell & Tummino LLP (57) ABSTRACT

An apparatus for measuring airflow in an airstream includes a generally planar panel adapted to be placed in the airstream so that air passes over opposite surfaces of the panel. The panel includes at least one slot that extends through the panel. A hot-point element is mounted on one of the panel surfaces adjacent the at least one slot. The at least one slot is configured to permit air passing over the opposite surfaces to pass through the slot and become mixed together. The hot-point element is positioned on the panel so that the mixed air passes over the hot-point element.

31 Claims, 7 Drawing Sheets

(56) References Cited

U.S. PATENT DOCUMENTS

| | | | | |
|---|---|---|---|---|
| 4,986,123 A | * | 1/1991 | Losing | F02D 41/187 |
| | | | | 73/114.34 |
| 5,201,221 A | * | 4/1993 | Forgacs | G01F 1/6845 |
| | | | | 73/204.26 |
| 6,647,775 B1 | * | 11/2003 | Hecht | G01F 1/6842 |
| | | | | 73/202.5 |

* cited by examiner

ANEMOMETER

RELATED APPLICATIONS

The present application claims priority U.S. Provisional Application Ser. No. 62/299,685, filed Feb. 25, 2016, the entirety of which is incorporated herein by reference.

TECHNICAL FIELD

The present disclosure is directed to air velocity sensing. More specifically, the present disclosure is directed to anemometer sensors and particularly those employing "hot-point" techniques for measuring airflow in an airstream.

BACKGROUND

Anemometers are instruments that are used to measure fluid velocity, such as the velocity of a gas or gasses, e.g., in a duct. Anemometers are used most commonly to measure airflow in a wide variety of scientific and industrial applications. In addition to measuring airflow, anemometers can also be configured to measure air pressure. This is because there is a close connection between the pressure and speed of flowing air. Airflow measurement remains the primary use for anemometers.

Anemometers can have a variety of configurations. Hot-point anemometers operate on the principle that air flowing past a heated structure has a cooling effect on that structure, and this cooling effect is proportional to the velocity of the air. In a hot-point anemometer, a hot-point element is a temperature sensitive element, such as a resistive element configured in a circuit (e.g., a Wheatstone bridge circuit) that heats the element electrically, typically with either a constant current or a constant voltage. The hot-point element is physically exposed to the airstream in which airflow is being measured. Air flowing past the element will have a cooling effect on the element, which changes the electrical resistance of the element. These changes in temperature/resistance are proportional to the velocity of the measured airflow and are reflected in the voltage output of the anemometer circuit.

Hot-point anemometers are typically configured to include a probe that is inserted into the airstream in which the airflow is to be measured. The probe, which can have a typical elongated tube configuration, can include an aperture .or opening through which air in the stream can pass. The hot-point element is exposed in this aperture. The hot-point element can be any of a variety of types.

One type of hot-point anemometer utilizes a very fine wire as the hot-point element. Commonly referred to as hot-wire anemometers, the wire used in these devices is typically a very small gauge metal wire (e.g., on the order of several micrometers), typically tungsten, that has a relatively high resistive response to temperature changes.

Another type of hot-point anemometer incorporates the use of a thermistor, such as bead thermistor, as the hot-point element. Thermistors are a class• of resistors whose resistance varies significantly with temperature and, as such, are well suited to for implementation in devices, such as anemometers, that measure temperature as a function of electrical resistance.

Another type of hot-point anemometer is a hot-film anemometer, which implements as the hot-point element a thin metallic film deposited on a semiconductor (e.g., Si or SiN) substrate. The film can have a structured configuration or pattern selected to provide a desired degree of exposure to the airstream. Hot-film elements can be advantageous because the sensitive sensor component can be distributed and patterned on a surface rather than being constrained, for example, by a wire or bead configuration. This flexibility in sensor configuration can, for example, be used to provide the hot-film element with a quick response time due to low heat capacity and low heat conduction due to a distributed sensor pattern, provided the substrate has a relatively low heat capacity.

Anemometers can implement electrical circuits that are configured in a variety of manners to measure airflow via the hot-point element. For example, a constant current anemometer ("CCA") implements. an electrical circuit that applies a constant current to the hot-point element. The voltage output from the circuit is the result of the circuit's maintaining the constant current given the change in resistance of the hot-point elements resulting from airflow. Similarly, a constant voltage anemometer ("CV A") implements an electrical circuit that applies a constant voltage to the hot-point element. The voltage output from the circuit is the result of the circuit's maintaining the constant voltage given the change in resistance of the hot-point elements resulting from airflow.

Additionally, a constant temperature anemometer ("CTA") implements an electrical circuit that is configured to maintain the hot-point element at a constant temperature. The voltage output from the circuit is the result of the circuit's maintaining the constant temperature of the hot-point element despite the cooling/heating effects of airflow. Further, pulse-width modulation ("PWM") anemometers are configured to infer the air velocity from the amount of time required for the wire to reach a specified resistance while a pulsed current of a predetermined frequency, duration, and amplitude is applied to the wire.

Hot-point anemometers are frequently used to measure airflow in environments where the airstream contains particulate contaminants such as dust, sand or stone. These contaminants can strike the hot-point element, which can cause damage the element. Over time, this damage can cause the anemometer to malfunction, lose accuracy, and ultimately limits its useful life.

These issues can be heightened with hot-wire anemometers. Since typical hot-wire is of a very small gauge, it is delicate and can be broken easily with significant impact. Since assembling hot-wire anemometers is typically cumbersome and done by hand, replacing broken hot-wire elements can be expensive. Additionally, anemometers that implement thermistors as hot-point elements make use of small bead thermistors, which can be similarly fragile when exposed in the air stream. Bead thermistor components typically include wire leads that require hand assembly.

Airflow measuring devices and instruments, commonly and collectively referred to as "airflow meters," have widespread use in science and industry. All of these uses require certain levels of accuracy, durability, and reliability. For instance, in the building automation industry, it is important that airflow meters are robust and low-cost to maintain. Depending on the environment in which the airflow meter is used, this can be a challenge. Industrial applications can expose the meter to a variety of particulates in the airstream. Where the airflow meter is a hot-point anemometer, the risk of damage in these environments can be high. Therefore, there is a need for a hot-point anemometer for use in these environments that is both reliable and easy to manufacture.

SUMMARY

The present invention relates to a system and apparatus for measuring airflow. According to one aspect the invention, a system for measuring airflow includes an apparatus including a hot-point anemometer. The anemometer has a sensor head with a panel based construction in which the panel is placed in the airstream in which airflow is to be measured. In one particular embodiment, the panel can include a printed circuit board. This construction represents a departure from the conventional metal probes that are typically used to position hot-point elements in the airstream.

According to one aspect, an apparatus for measuring airflow in an airstream includes a generally planar panel adapted to be placed in the airstream so that air passes over opposite surfaces of the panel. The panel includes at least one slot that extends through the panel. A hot-point element is mounted on one of the panel surfaces adjacent the at least one slot. The at least one slot is configured to permit air passing over the opposite surfaces to pass through the slot and become mixed together. The hot-point element is positioned on the panel so that the mixed air passes over the hot-point element.

According to another aspect, the panel can have a printed board construction including one of a printed circuit board (PCB) and a printed wiring board (PWB).

According to another aspect, the hot-point element can include an element that radiates heat which can be carried off by passing airflow and that has a measurable property or characteristic that fluctuates with its temperature. The hot-point element can include a temperature dependent resistive element. The temperature dependent resistive element can include a resistor, a hot-wire element, a thermistor element, a hot-film element, or a thin metal element. The hot-point element can include a semiconducting element. The hot-point element can include a diode or a transistor.

According to another aspect, the hot-point element can include a surface mount device that is secured to the PCB using surface mount technology. The hot-point element can include a device that is integrated into the PCB. The hot-point element can include a device that is embedded or buried in the PCB. The hot-point element can include a surface mount thermistor that is secured to the PCB using surface mount technology.

According to another aspect, the panel can include a leading edge including a chamfer or a bevel. The panel can be configured to be placed in the airstream with the leading positioned upstream so that the chamfer or bevel splits the airstream to flow over the opposite surfaces of the panel while helping to minimize turbulence resulting from the split airstream.

According to another aspect, the at least one slot can include a pair of slots that are spaced from each other and extend parallel to each other. The slots can define a strip that extends between the slots. The hot-point element can be mounted on the strip adjacent the slots. The slots can help to thermally isolate the strip from the remainder of the panel. The thermally isolated strip can help to thermally isolate the hot-point element attached thereto from heat transfer from remaining portions of the panel. The slots can allow the air flowing on opposite sides of the panel to pass through the panel and mix together and flow along the hot-point element mounted on the strip. The hot-point element can be mounted on the strip proximate downstream ends of the slots.

According to another aspect, the apparatus can include blocking elements for deflecting particulates in the airstream from impacting the hot-point element. The blocking elements can be positioned upstream from the hot-point element along the leading edge of the panel. The blocking elements can be shaped, positioned, patterned, or a combination thereof, to create a pressure drop on the leeward of the blocking elements. The pressure drop can draw the air flow closer to the panel to more effectively couple of the air flow to the hot-point element.

According to another aspect, the blocking elements can include projections having at least one of the following shapes: cylindrical shapes, spherical shapes, semi-spherical shapes, cylindrical with a semi-spherical top shapes, hillock shapes, drop shapes, airfoil shapes, elliptical shapes, and ellipsoidal shapes. The blocking elements can have a shape selected to minimize disturbance of the airstream. The blocking elements can be arranged such that the airstream cannot pass along a direct linear path through the blocking elements and across the hot-point element. The blocking elements can be soldered projections, epoxy projections, or projections molded onto the panel. The blocking elements can be arranged in an array including at least one row. The blocking elements can be arranged in an array including at least two rows, wherein the rows are staggered such that blocking elements in one row are positioned between blocking elements of the adjacent rows. The blocking elements can be arranged such that the airstream cannot pass along a direct linear path through the blocking elements and across the hot-point element.

According to another aspect, the panel can be is adapted to be supported in a probe. The probe can be adapted to be positioned in the airstream. The probe can include a support portion for supporting the panel. The support portion can include portions between which the panel is sandwiched. The support portion can include one or more apertures in which the hot-point element is positioned and through which air passes through and over the opposite surfaces of the panel. The probe can have an elongated tubular configuration. The support portion can include an end portion of the probe.

According to another aspect, an apparatus for measuring airflow in an airstream includes a generally planar panel adapted to be placed in the airstream so that air passes over opposite surfaces of the panel. The apparatus also includes a hot-point element mounted on one of the panel surfaces so that the airstream passes over the hot-point element. The apparatus further includes blocking elements for deflecting particulates in the airstream from impacting the hot-point element.

According to another aspect, the panel can have a printed board construction including one of a printed circuit board (PCB) and a printed wiring board (PWB).

According to another aspect, the hot-point element can include a hot-wire, a thermistor, or a hot-film element. The hot-point element can include a surface mount device that is secured to the PCB using surface mount technology. The hot-point element can include a surface mount thermistor that is secured to the PCB using surface mount technology.

According to another aspect, the panel can include a leading edge including at least one of a chamfer and a bevel. The• panel can be configured to be placed in the airstream with the leading positioned upstream so that the at least one of a chamfer and bevel splits the airstream to flow over the opposite surfaces of the panel while helping to minimize turbulence resulting from the split airstream.

According to another aspect, the blocking elements are positioned upstream from the hot-point element along the leading edge of the panel. The blocking elements can include projections having one of the following shapes: cylindrical, spherical, semi-spherical, cylindrical with a semi-spherical top, hillock, drop, airfoil, elliptical, and ellipsoidal. The blocking elements can have a shape selected to minimize disturbance of the airstream. The blocking elements can be arranged such that the airstream cannot pass along a direct linear path through the blocking elements and across the hot-point element. The blocking elements can include soldered projections, epoxy projections, or projections molded onto the panel. The blocking elements can be arranged in an array including at least one row. The blocking elements can be arranged in an array including at least two rows, wherein the rows are staggered. such that blocking elements in one row are positioned between blocking elements of the adjacent rows.

According to another aspect, the panel can include at least one slot that extends through the panel. The hot-point element can be mounted on one of the panel surfaces adjacent the at least one slot. The at least one slot can be configured to permit air passing over the opposite surfaces of the panel to pass through the slot and become mixed together. The hot-point element can be positioned on the panel so that the mixed air passes over the hot-point element. The at least one slot can include a pair of slots that are spaced from each other and extend parallel to each other. The slots can define a strip that extends between the slots. The hot-point element can be mounted on the strip adjacent the slots.

According to another aspect, the slots can help to thermally isolate the strip from the remainder of the panel. The thermally isolated strip can help to thermally isolate the hot-point element attached thereto from heat transfer from remaining portions of the panel. The slots can allow the air flowing on opposite sides of the panel to pass through the panel and mix together and • flow along the hot-point element mounted on the strip. The hot-point element can be mounted on the strip proximate downstream ends of the slots.

According to another aspect, the panel can be adapted to be supported in a probe. The probe can be adapted to be positioned in the airstream. The probe can include a support portion for supporting the panel. The support portion can include portions between which the panel is sandwiched. The support portion can include one or more apertures in which the hot-point element is positioned and through which air passes through and over the opposite surfaces of the panel. The probe can have an elongated tubular configuration, and the support portion can include an end portion of the probe.

According to another aspect, a method for manufacturing an apparatus for measuring airflow in an airstream includes providing a generally planar panel adapted to be placed in the airstream so that air passes over opposite surfaces of the panel, the panel including a printed circuit board (PCB). The method also includes providing surface mount solder pads on one of the opposite surfaces on the PCB. The method also includes surface mounting a hot-point element on the solder pads.

According to another aspect, the method includes providing at least one of a chamfer and a bevel on a leading edge of the panel to split the airstream to flow over the opposite surfaces of the panel while helping to minimize turbulence resulting from the split airstream. The method can also include providing blocking elements on the PCB for deflecting particulates in the airstream from impacting the hot-point element. The step of providing blocking elements can include positioning the blocking elements upstream from the hot-point element along the leading edge of the panel. The step of providing blocking elements can also include arranging the blocking elements such that the airstream cannot pass along a direct linear path through the blocking elements and across the hot-point element. The step of providing blocking elements can further include arranging the blocking elements in an array including at least one row, wherein arrays including at least two rows can include staggering the rows such that blocking elements in one row are positioned between blocking elements of the adjacent rows.

According to another aspect, the method can include providing at least one slot that extends through the PCB. The method can also include mounting the hot-point element on the PCB adjacent the at least one slot, the at least one slot being configured to permit air passing over the opposite surfaces of the panel to pass through the slot and become mixed together. The method can further include positioning the hot-point element on the panel so that the mixed air passes over the hot-point element.

According to another aspect, the step of providing at least one slot can include providing a pair of slots that are spaced from each other and extend parallel to each other, the slots defining a strip that extends between the slots and mounting; and mounting the hot-point element being on the strip adjacent the slots. The method can also include providing on the PCB a strip defined by slots in the PCB and mounting the hot-point element on the strip to thermally isolate the hot-point element from the from heat transfer from the remaining portions of the PCB. The step of mounting the hot-point element can include mounting the hot-point element on the strip proximate downstream ends of the slots. The step of mounting the hot-point element can also include embedding the hot-point element in the strip.

BRIEF DESCRIPTION OF THE DRAWINGS

The present invention is illustrated by way of example and not limitation in the figures of the accompanying drawings, in which •like references indicate similar elements and in which.

DESCRIPTION

Figure 1:
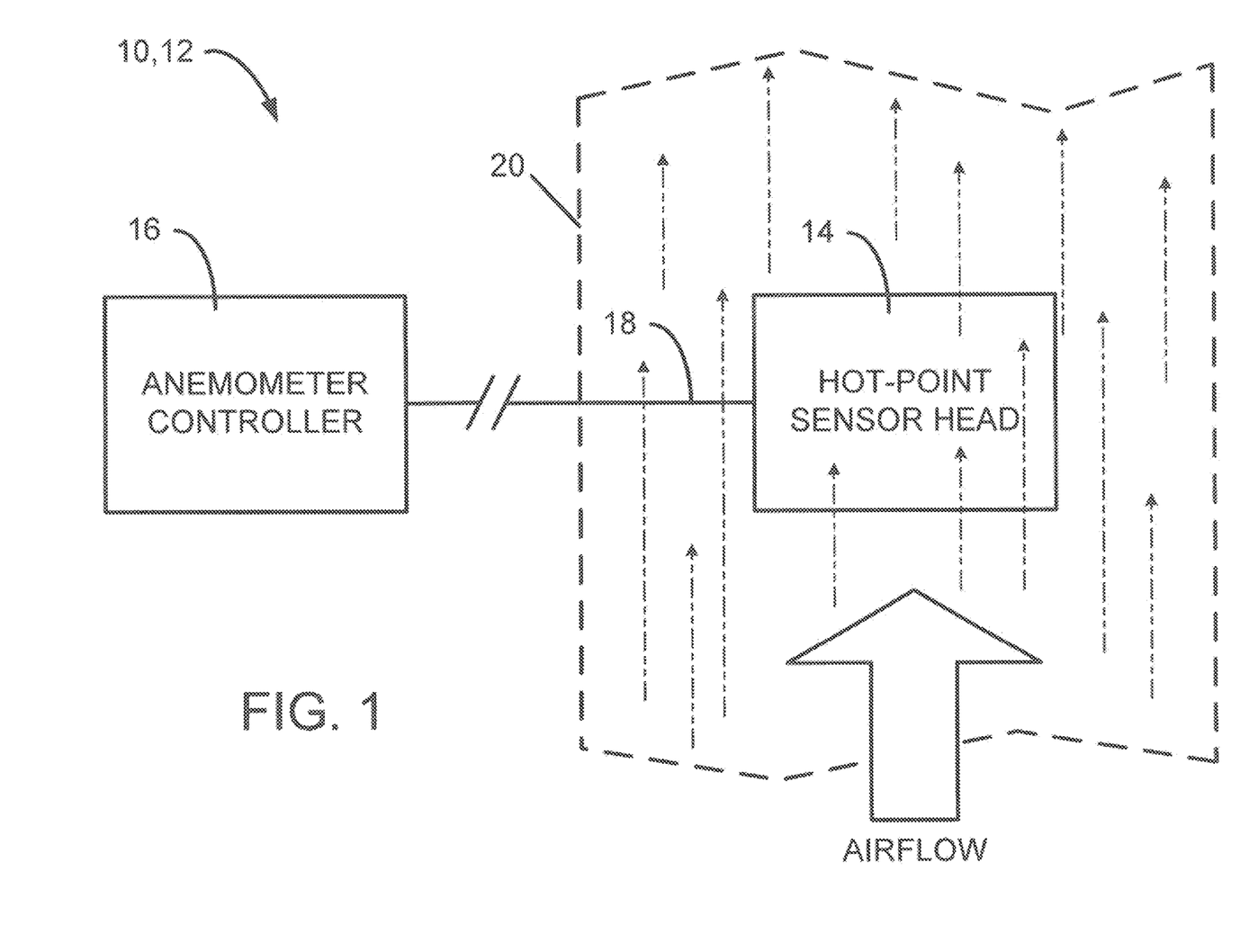
FIG. 1 is a schematic illustration of a system for measuring airflow, according to the invention.

Referring to FIG. 1, a system 10 for measuring airflow of an airstream comprises a hot-point anemometer 12. The anemometer 12 includes a hot-point sensor head 14 and a controller 16 interconnected by wire(s) or cable(s) 18. The sensor head 14 is adapted to be placed in the airstream (indicated generally by the dashed lines in FIG. 1) within a structure 20, such as a ductwork, to measure the airflow (indicated generally by the large arrow in FIG. 1) in that structure. In this description, "airstream" is used to refer to the air that flows in the structure 20. "Airflow" is used to refer to the volumetric flow rate of the air in the airstream.

The sensor head 14 includes at least one hot-point element (described in further detail herein below) that is exposed to the airstream in the structure 20. Through the cabled connection between the controller 16 and the sensor head 14, the hot-point element is placed in an electrical circuit that can be used to measure the airflow in the structure 20. The controller 16 is adapted to control the sensor head 14 by powering the hot-point element and measuring or otherwise monitoring at least one of current, voltage, and resistance properties of the hot-point circuit. The controller 16 provides an output with a voltage that varies in response to the airflow in the structure 20.

FIGS. 2-5 illustrate an example embodiment of the hot-point sensor head 14. According to this example embodiment, the sensor head .14 includes a panel 30 upon which various structural and electrical components 32 used to construct the anemometer 12 are mounted. In this example, the panel •30 has a generally flat, planar, and rectangular configuration. The panel 30 has a length (L) measured generally vertically in FIG. 2, a width (W) measured horizontally in FIG. 2, and a thickness (T) measured generally vertically in FIG. 3. The panel 30 can have an alternative shape selected, for example, to suit the particular space in which the anemometer 12 is to be implemented.

In the embodiment illustrated in FIGS. 2-5, the sensor head 14 has a construction in which the panel 20 is formed with a printed •board construction, such as a printed circuit board ("PCB") or printed wiring board ("PWB") construction. In the example embodiment, the panel 20 is formed with a PCB 40. The panel 30 could, however, be constructed in a variety of different manners. For example, the panel 30 could be a glass or ceramic substrate with a metalized surface upon which circuits can be formed. As another example, the panel 30 could have a plastic construction formed, for example, by molding, pressing, extruding, machining, or a combination of two or more of these processes to achieve the desired configuration, again with a metalized surface for circuit formation. As further example, the panel 30 could be constructed of a metal, such as sheet metal, that is stamped, cut, bent, formed, or otherwise machined to achieve the desired configuration, although forming circuits on this structure would require insulation and further metallization.

The PCB 40 can have a variety of constructions. In one example construction, the PCB 40 can be a standard FR4 grade PCB. As known in the art, FR4 PCBs are an industry standard PCB constructed of a flame retardant, glass-reinforced epoxy material. Any alternative PCB material that is suited for the particular environment in which the sensor head 14 will be positioned can be used. The PCB 40 can be clad on one or both sides with copper that is etched to form the electrical pads and traces to form the circuits necessary to operate the anemometer 12. Through-holes extending from a front (F) surface to a rear (R) surface of the PCB 40 can receive pins or wires for soldering. A protective layer, such as a screened or laminated mask, can be layered on top of the traces to protect them from damage and to insulate them electrically in order to avoid short circuiting. The PCB 40 can have a variety of thicknesses ranging, for example, from about 0.25-4.0 mm, or more. For instance, the PCB 40 can be a 10 mil (0.25 mm) FR4 grade PCB material.

Figure 2:
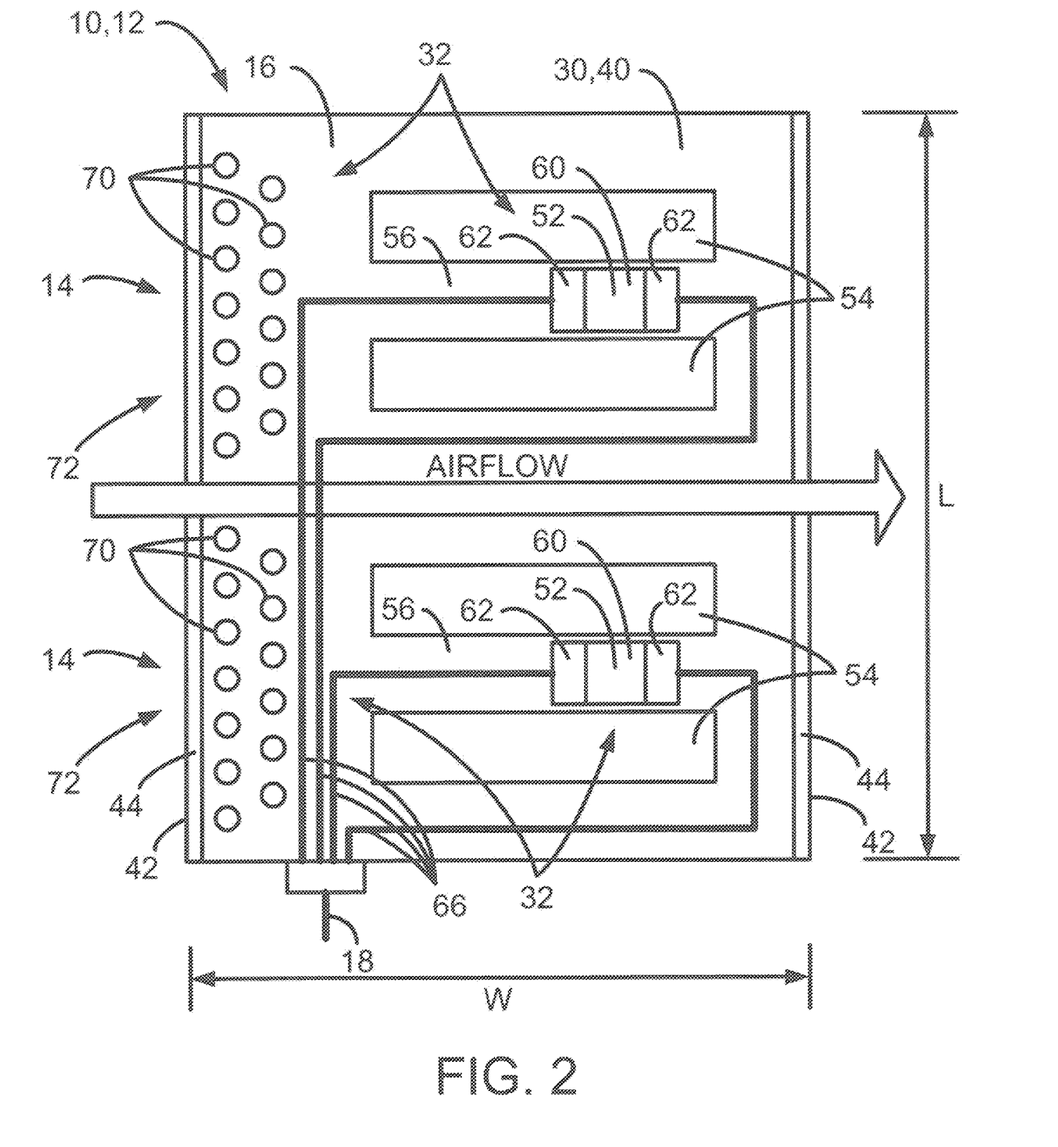
FIG. 2 is a schematic view illustrating an apparatus that makes up a portion of the system of FIG. 2.
Figure 3:
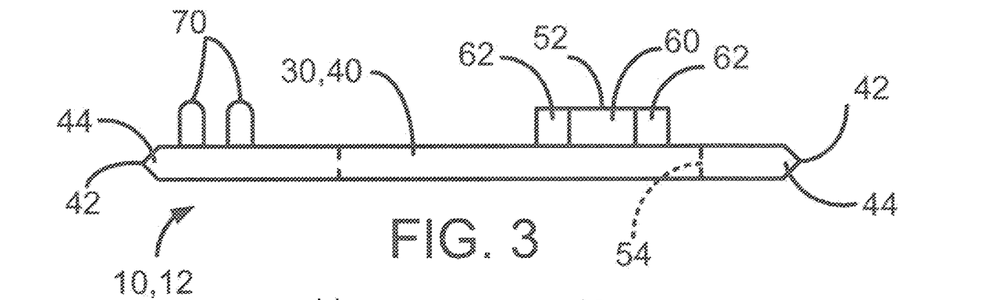
FIG. 3 is a bottom view of the apparatus of FIG. 2.
Figure 4:
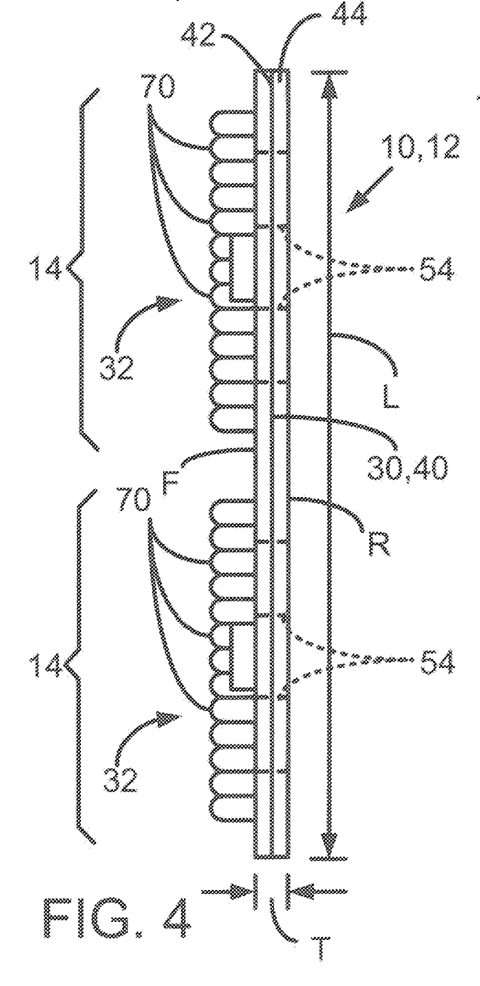
FIGS. 4-5 are opposite side views of the apparatus of FIG. 2.
Figure 5:
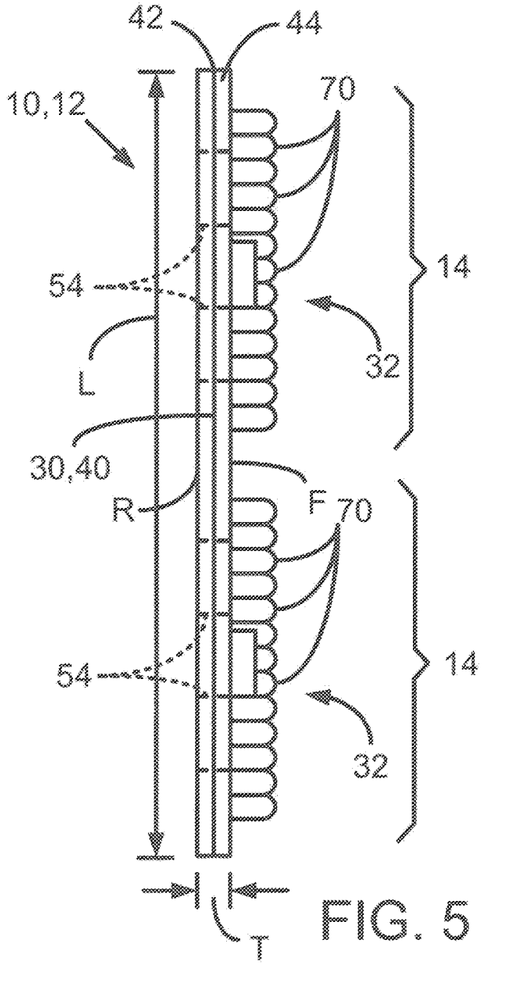

As shown in FIG. 2, the components 32 are mounted on the front surface F of the PCB 40. Although not the case in the illustrated example, components could also be mounted on the rear surface R of the PCB. The rear R surface could also be used for electrical traces or for connecting the components 32 to the front surface F by soldering component leads or wires that extend through holes in the PCB 40.

In the embodiment illustrated in FIGS. 1-5, the anemometer 12 is configured for an installation in an airstream so that the airflow (indicated generally by the large arrows in FIGS. 1 and 2) is directed across the width W of the panel 30 (e.g., PCB 40). To improve the aerodynamics of the panel 30, longitudinal edges 42 of the panel can include a bevel or chamfer 44. Placed along the leading edge of the panel 30, the chamfer/bevel 44 acts to reduce turbulence while splitting the airstream over the front F and rear R surfaces of the panel. This helps to ensure that the air flows smoothly along the front F and rear R of the panel 30. Additionally, orienting the anemometer 12 so that the width W of the panel 30 extends parallel to the airflow direction can further improve the aerodynamic performance of the anemometer.

In the embodiment illustrated in FIGS. 1-5, the sensor head 14 includes two hot-point element sensor arrangements 50, each of which includes a hot-point element 52. An upper one of the sensor arrangements 50 is positioned generally above the airflow arrow in FIG. 2, and the other, lower, sensor arrangement is positioned generally below the airflow arrow in FIG. 2. The sensor head 14 could include any number of hot-point element sensor arrangement 50, that is to say, one or more. Regardless of the construction, the sensor element arrangements 50 are configured to be controlled and operated through the cabled connection between the controller 16 and the sensor head 14. In the illustrated two sensor configuration, the two hot-point element sensor arrangements 50 could be used to offer redundant airflow sensing. Alternatively, one arrangement 50 could be used to provide a sensed airflow signal and the other could be used to provide a reference (e.g., temperature) signal.

Referring to FIGS. 2-5, the base 30, i.e., the PCB 40, includes two pairs of rectangular slots 54, one pair being associated with one of the sensor arrangements 50 and the other pair being associated with the other of the sensor arrangements. The slots 54 are generally elongated, aligned with each other, and extend parallel with each other across the width of the PCB 40. As shown in FIGS. 2-5, the slots 54 can be rectangular. The slots 54 could, however, have alternative shapes and configurations. A mounting strip 56 is defined between the slots 54 in each pair. The hot-point element 52 of each sensor arrangement 50 is mounted to its corresponding mounting strip 56. In the example embodiment, the hot-point elements 52 are mounted proximate downstream ends of the slots 54. The hot-point elements 52 could, however, be mounted at alternative locations on the strip, especially where the blocking elements 70 have different locations on the PCB 40 or where the slots 54 defining the strip have different configurations.

The hot-point elements 52 can be any element that radiates heat that can be carried off by passing airflow and that has a measurable property or characteristic that fluctuates with its temperature. As such, the hot-point elements can have a variety of configurations. The hot-point elements 52 can, for example, comprise resistive elements, such • as resistors, hot-wire elements, bead thermistor elements, hot-film elements, or thin metal elements. As another example, the hot-point elements can be semiconducting elements, such as diodes or transistors. These elements could, for example, be connected to the PCB 40 via plated through holes, wherein metal leads of the hot-point elements 52 could extend through the holes and be connected to the rear surface of the PCB via a solder connection. Additionally, according to one particular example configuration of the invention, the hot-point elements 52 can comprise thermistors 60 that utilize surface mount technology ("SMT") which allows the thermistor to be mounted directly onto the PCB 40. As another example, the hot-point elements 52 could be buried, embedded, or integrated into the PCB 40 itself.

Figure 6:
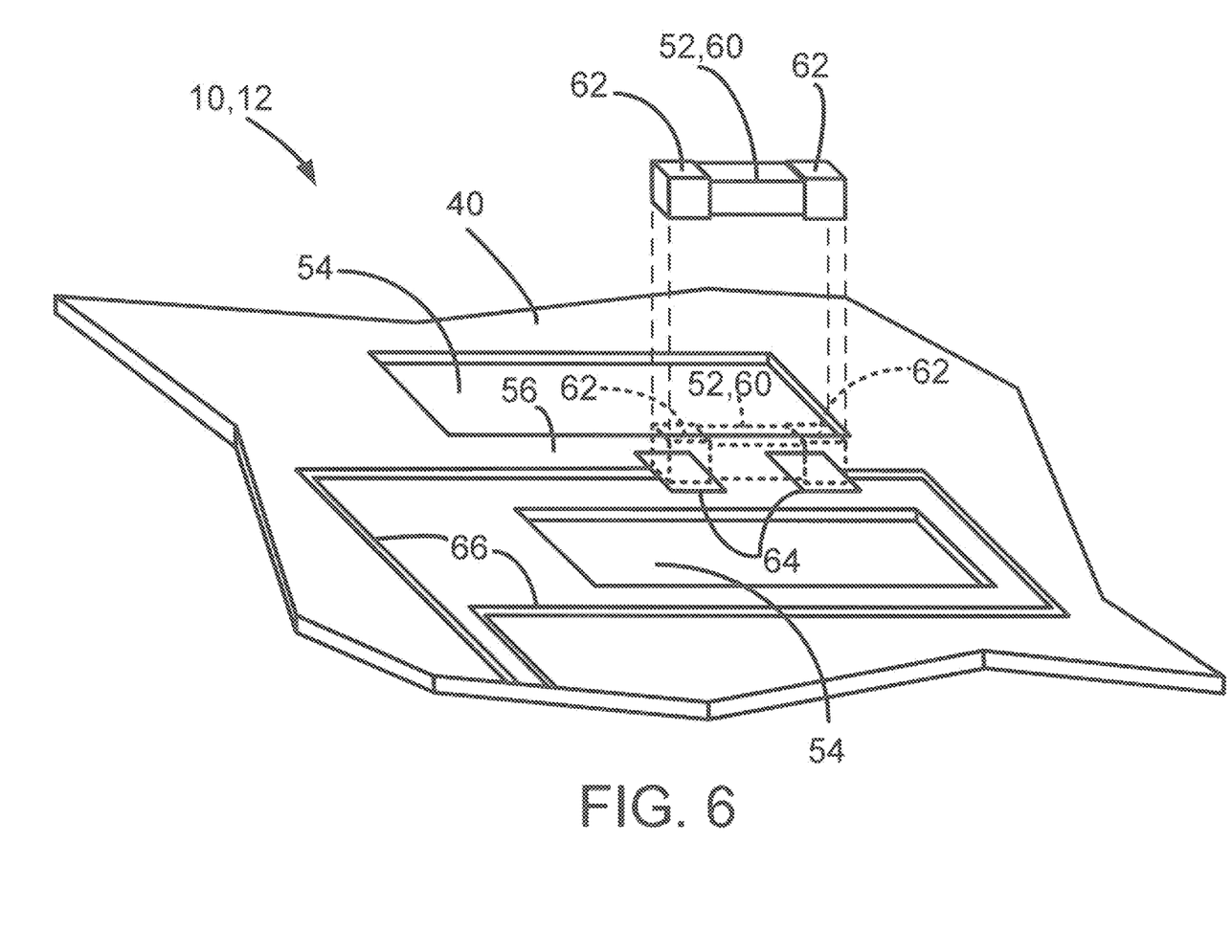
FIG. 6 is a perspective view illustrating an example construction of the apparatus of FIG. 2.

Referring to FIG. 6, the SMT thermistor 60 includes metal electrode portions 62 for making an electrical connection with solder pads 64 on the mounting strip 56 of the PCB 40. The pads 64 are connected to traces 66, which form a circuit with the controller 16 via the cable 18 (see FIG. 1). Advantageously, SMT thermistor 60 can be mounted on the PCB 40 simply by heating and melting the solder pads 64, placing the electrode portions 62 on the pads, and thereafter allowing the pads to cool.

To help protect the hot-point element 52 (e.g., the SMT thermistor 60) from damage caused by impacts with contaminates or particulate matter or other objects in the airstream (hereafter "particles"), the components 32 mounted to the panel 30 (e.g., the PCB 40) can include particle blocking elements 70. The blocking elements 70 can be constructed of a variety of materials, such as plastic or metal, and can be connected to the panel 30 in a variety of manners. For example, plastic blocking elements 70 could be connected to the panel 30 via an adhesive, such as a glue or epoxy. Example constructions for the blocking elements 70 include solder balls, solder hillocks, and epoxy posts. In an embodiment where the panel 30 has a plastic construction, the blocking elements 70 could be molded integrally with the panel.

Metal blocking elements 70 could be connected to the panel 30 via an adhesive or solder. Soldered metal blocking elements 70 could, for example, be a good match where the panel 30 is the PCB 40, and the SMT thermistor 60 also requires soldering. In this instance, all of the components 32 could be SMT components mounted to a PCB 40.

One purpose of the blocking elements 70 is to deflect particles in the airstream that are on course to impact the hot-point element 52. Ideally, the blocking elements 70 are configured so as to deflect particles in the airstream with minimal disturbance of the airstream. The blocking elements 70 could have a variety of shapes and configurations consistent with these considerations. For example, the blocking elements 70 could be cylindrical, semi-spherical, or cylindrical with a spherical top. In the embodiment illustrated in FIGS. 1-7, the blocking elements 70 are cylindrical with a semispherical top. Alternative shapes, such as drop shapes, airfoil shapes, elliptical or ellipsoidal shapes, wedges, pyramids, cones, or any other shape selected to both deflect particles and minimize disturbance of the airstream.

Another purpose of the blocking elements 70 can be to create a pressure drop on the leeward side of the blocking elements. The purpose of creating this pressure drop would be to draw the air flow closer to the panel 30, which would provide a more effective thermal coupling of the air flow to the hot-point element 52. To this end, the shapes, positions, and patterns of the blocking elements 70 can be selected to facilitate or promote this pressure drop.

Figure 7:
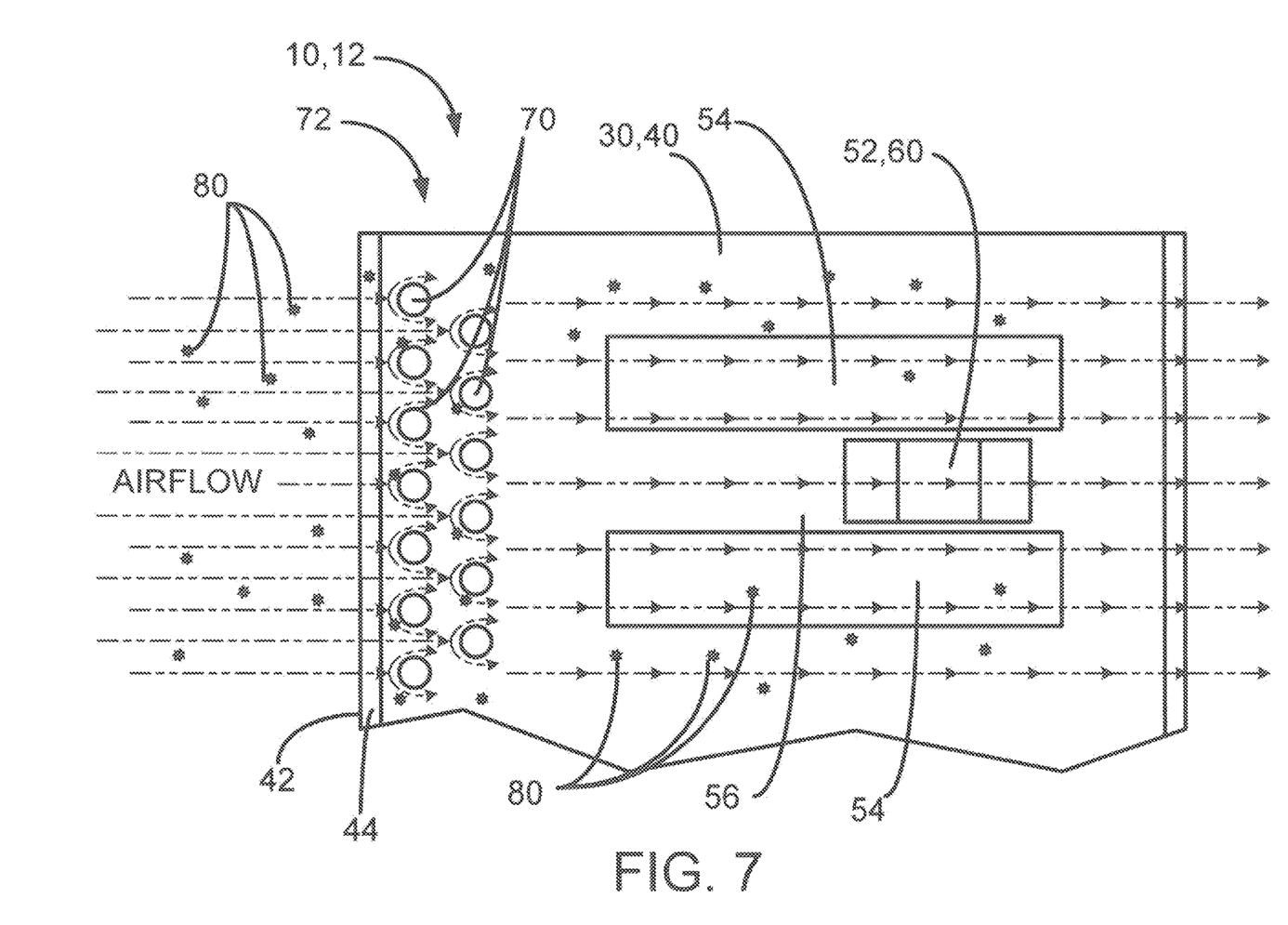
FIG. 7 is a schematic view illustrating a portion of the apparatus of FIG. 2 during use.
Figure 8:
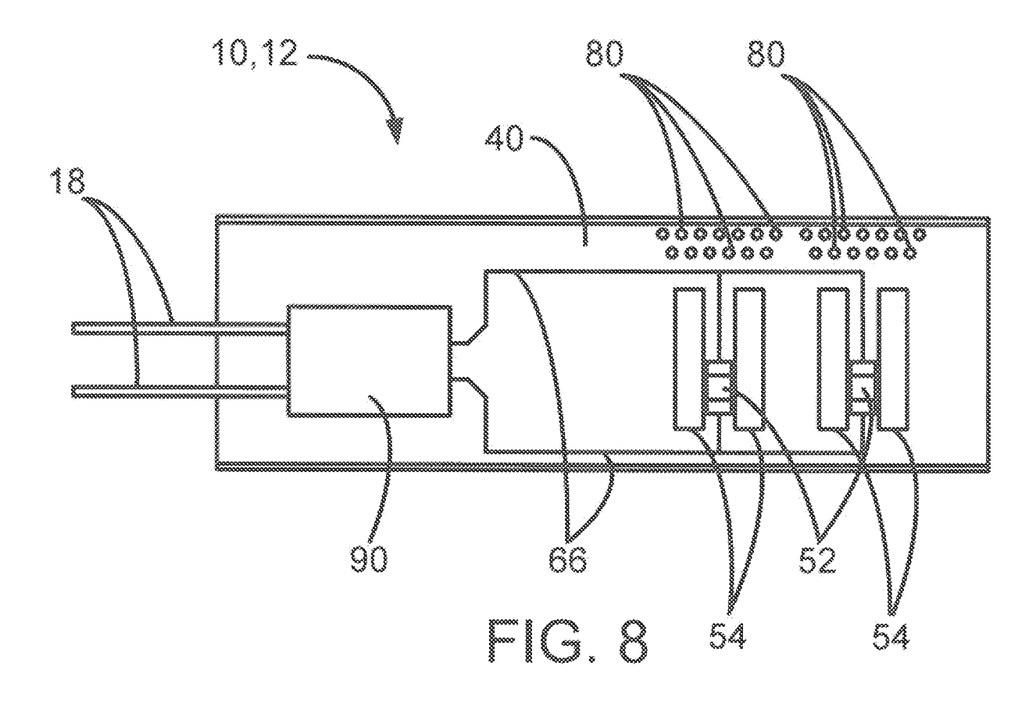
FIGS. 8-9 illustrate an example implementation of the apparatus of the apparatus of FIGS. 1-7.
Figure 9:
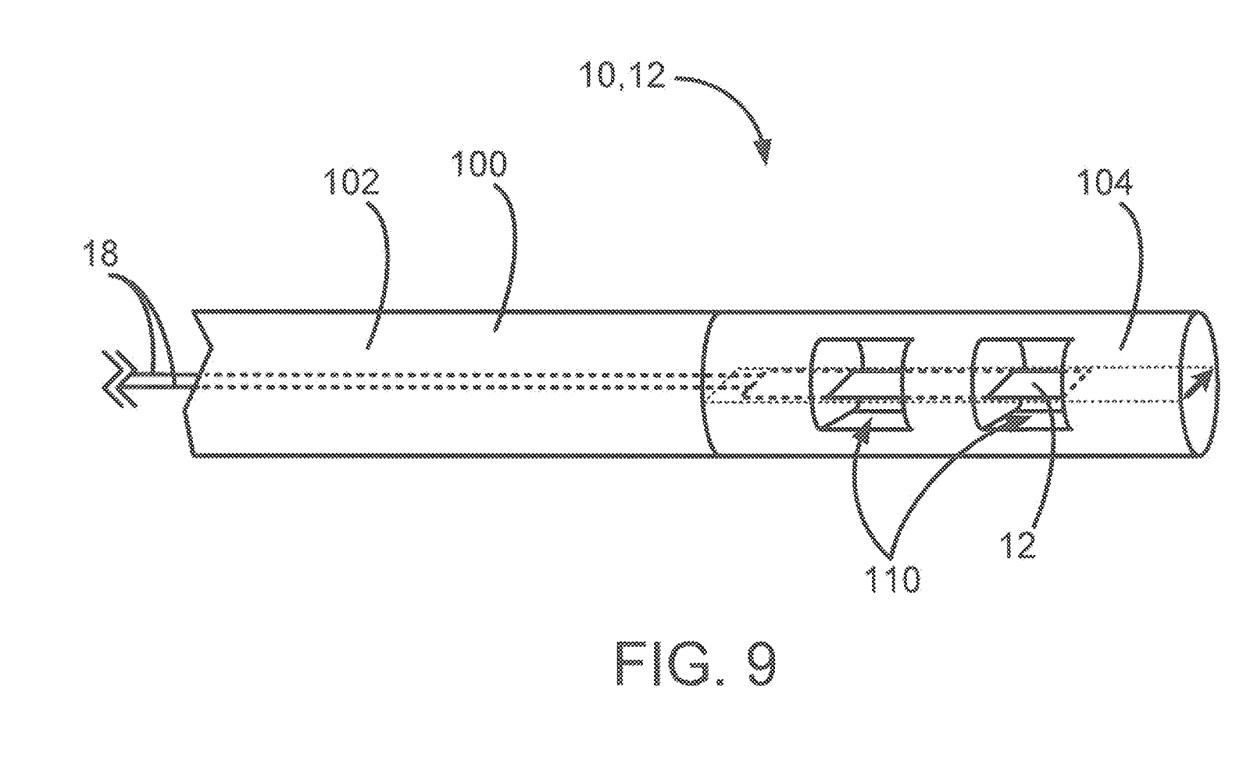

Referring to FIG. 7, the blocking elements 70 are arranged in an array 72 along a leading edge 42 of the panel 30/PCB 40, adjacent the bevel 44. In the example embodiment, the array 72 comprises two longitudinally extending rows 74, which extend vertically as viewed in FIG. 7. The blocking elements 70 could have alternative arrangements, such as an array with greater than two rows or in any other pattern configured to block particles that may encounter the hot-point element 52.

In operation, the anemometer 12 functions to determine air flow in the structure 20 in a known manner. The anemometer controller 16 supplies electrical current to the hot-point sensor head 14 to heat the hot-point element 52 to a predetermined set point temperature. The controller 16 also interrogates the hot-point sensor head 14 to determine the actual temperature of the hot-point element 52. The controller 16 calculates the difference between the set point temperature and the actual temperature, attributes this difference to cooling due to air flow in the structure 20, and extrapolates from this the airflow rate that would produce this difference. The controller can interrogate the second sensor arrangement 50 on the panel 30 to provide air temperature compensation to the calculation.

The construction of the anemometer 12 is also advantageous in terms of providing accurate and reliable airflow measurements. The panel 30, having a plastic or PCB 40 construction, provides excellent insulating properties, both thermal and electrical. The panel 30 thus can isolate the hot-point element 52 from thermal transfer from the panel, which helps to ensure that temperature changes in the elements are due more exclusively to the current provided by the controller 16 and heat transfer to the airstream in the structure 20. Additionally, the slots 54 help to act to thermally isolate the strip 56 upon which the hot-point element 52 is mounted from other portions of the panel 30. This helps prevent heat generated by the hot-point element 52 from transferring to and dissipating into the panel 30.

Further, while the slots 54 help to thermally isolate the hot-point elements 52 from the panel 30/PCB 40, they also help to improve the heat transfer between the air flowing in the structure 20 and the hot-point elements. As best illustrated in FIG. 7, each hot-point element 52 is positioned proximate, adjacent, or near a downstream end of the adjacent slots 54. This configuration allow the airstream passing over the front F and rear R sides of the panel 20 to come together and mix with each other prior to passing along or over hot-point element 52. The shape of the slots 54 can be selected to promote this mixing and to draw off turbulence created by the blocking elements 70. The slots 54 in the panel 30 thus help ensure that the hot-point element 52 is thermally isolated from the panel while at the same time helping to ensure complete and efficient thermal transfer between the hot-point element and the airstream.

Referring to FIG. 7, during operation, the blocking elements 70 help to deflect particles 80 carried by the airstream (indicated generally by the dashed arrows) from impacting the hot-point element 52 (e.g., the SMT thermistor 60). As the particles 80 are carried by the airstream toward the anemometer 12, the bevel 44 splits the airstream aerodynamically so as to help minimize the disturbance introduced by the edge 42. As the airstream flows beyond the edge 42, it engages the blocking elements 70.

In the two row arrangement illustrated in FIG. 7, the blocking elements 70 are spaced from each other in the rows 74 and the rows themselves are staggered such that there no direct linear path perpendicular to the rows across which the airstream can travel without engaging a blocking element. The number of blocking elements 70, the number and spacing of the rows, the overlap between the elements in the rows, and the size and shape of the elements themselves can be selected or adjusted in order to provide a degree of protection commensurate with the environment in which the anemometer 12 is installed.

By placing the anemometer 12 in the airstream so that the panel 30/PCB 40 is parallel to the airflow direction, any particles 80 travelling in the airstream along a path that coincides with the hot-point element 52 should encounter one or more blocking elements 70. The blocking element(s) 70 will deflect the particle 80, decreasing its velocity and changing its course. Ideally, the altered course of the particle 80 will take it away from the hot-point element 52. If, however, the particle 80 manages to stay on course for the hot-point element 52, its reduced velocity will help reduce or minimize its impact.

The position of the blocking elements 70 on the panel 30/PCB 40 is selected/configured to be sufficient for the airstream to flow beyond the mechanical disturbance and allow the leeward turbulence to dissipate prior to encountering the hot-point element 52. While the blocking elements 70 help prevent particles 80 from impacting the hot-point element 52, the slots 54 help maintain a steady and even airflow around and over the hot-point element. In addition, as the air flows over the blocking elements 70, a partial vacuum is formed on the leeward side of the blocking elements. This partial vacuum serves to pull •the air stream closer to the .PCB and hot-point element. This aerodynamic effect improves the coupling of the hot-point element with the air stream.

The slots 54 allow air to move from the rear side to the front side of the panel 30/PCB 40 which allows for any differential air pressures on opposite sides of the panel/PCB to equalize. This helps create a more uniform airflow over the hot-point element 52, which helps improve the accuracy of the anemometer 12. Since non-uniform airflow patterns translate to inconsistent rates of heat transfer to/from the hot-point element 52, measurements based on heat transfer to/from the hot-point element, i.e., airflow measurements, will be inconsistent. Therefore, in helping to provide uniform airflow over the hot-point element 52, the slots 54 help improve the accuracy and reliability of the anemometer 12.

FIGS. 8 and 9 illustrate an example implementation of the apparatus 10 of FIGS. 1-7. In this implementation, the apparatus 10 comprises an anemometer 12 that includes a PCB 40 upon which the hot point elements 52 and blocking elements 70 are mounted. In this configuration, the blocking elements 70 can, for example, be solder mounds secured to copper pads of the PCB substrate exposed from the PCB masking material. The slots 54 are formed in the PCB 40 on opposite sides of the hot point elements 52, as described above.

Circuitry or circuit components 90, illustrated schematically, are mounted, e.g., soldered, to the PCB 40. The circuitry 90 is connected to the hot point elements 52 via traces 66. Wires/cabling 18, connected physically to the PCB 40 and electrically to the traces 66, supply power to the circuitry 90 and hot point elements 52 and communicate electronically with the circuitry to obtain measurements and or signals related to the air flow measured via the anemometer 12.

The form factor of anemometer 12 illustrated in FIG. 8 is elongated and rectangular. Referring to FIG. 9, this form factor is chosen so that the anemometer 12 can be implemented in a probe 100, which can be inserted into or otherwise positioned in an airstream with as little disturbance to the airstream as possible. For example, the probe 100 can have a diameter less than 0.50 inches, or even less than 0.25 inches, and can thus function with minimal air flow disturbance.

The probe 100 as illustrated has an elongated cylindrical configuration. The materials used to construct the probe 100 can vary. For example, the probe 100 can include a base portion 102 that has a stainless steel tube construction. The base portion 102 can have any desired length. The probe 100 can also include end portion 104, connected coaxially to the base portion 102 that forms the terminal end of the probe. As shown in FIG. 9, a directional arrow can be embossed or otherwise formed at the tip of the probe 100 to indicate to the installer the proper air flow direction.

The end portion 104 supports the anemometer 12. In the embodiment of FIG. 9, the end portion 104 can, for example, have a two-piece plastic construction, such as a molded plastic construction. In this example, the end portion 104 can be configured to receive the anemometer 12, which becomes sandwiched between the pieces. When the pieces of the end portion 104 are secured to each other, e.g., mechanically or via an adhesive, the anemometer 12 becomes fixed to the end portion. The wires/cables 18 can pass through the interior of the tubular base portion 102 to a metering device that interrogates the anemometer 12.

The end portion 104 is configured with a pair of apertures 110 that correspond with the pair of hot point elements 52 of the anemometer 12. When the anemometer 12 is mounted in the end portion 104 of the probe 100, each of the hot point elements 52 and its associated slots 54 and blocking elements 70, are positioned in a corresponding one of the apertures 110.

In use, the probe 100 is inserted into the airstream, for example, through an opening in ductwork. To this end, the probe 100 could be configured with fittings or mounting structures (not shown) that cooperate with similar mating components on the structures in which the probe 100 is to be inserted. Such structures could, for example, be constructed and arranged to direct the probe 100 along a desired trajectory, and to position the apertures 110 in a desired orientation within the airstream.

From the above description of the invention, those skilled in the art will perceive improvements, changes and modifications. These and other such improvements, changes and modifications within the skill of the art are intended to be covered by the appended claims.

What is claimed is:

1. An apparatus for measuring airflow in an airstream, the apparatus comprising:

a generally planar panel adapted to be placed in the airstream so that air passes over opposite surfaces of the panel, the panel comprising a pair of slots that extend through the panel, the pair of slots being spaced from each other and extending parallel to each other, each slot of the pair of slots being elongated and having a leading end and an opposite trailing end, the pair of slots defining a strip that extends between the pair of slots; and a hot-point element mounted on one of the panel surfaces and on the strip adjacent the pair of slots, the hot-point element being configured to measure the airflow in a direction parallel to lengths of the pair of slots, the pair of slots being configured to permit air passing over the opposite surfaces to pass through the pair of slots and become mixed together, the hot-point element being positioned along the lengths of the pair of slots proximate to the trailing ends of the pair of slots and distal from the leading ends of the pair of slots so that the mixed air passes over the hot-point element.

2. The apparatus recited in claim 1, wherein the panel has a printed board construction comprising one of a printed circuit board (PCB) and a printed wiring board (PWB).

3. The apparatus recited in claim 1, wherein the panel includes a leading edge comprising at least one of a chamfer and a bevel, the at least one of a chamfer and bevel being configured to split the airstream to flow over the opposite surfaces of the panel while helping to minimize turbulence resulting from the split airstream, wherein the leading ends of the pair of slots is proximate the leading edge of the panel and the trailing ends of the pair of slots is distal of the leading edge of the panel.

4. The apparatus recited in claim 1, wherein the pair of slots are configured to thermally isolate the strip from the remainder of the panel, the thermally isolated strip helping to thermally isolate the hot-point element attached thereto from heat transfer from remaining portions of the panel.

5. The apparatus recited in claim 1, wherein the pair of slots allow the air flowing on opposite sides of the panel to pass through the panel and mix together and flow along the hot-point element mounted on the strip.

6. The apparatus recited in claim 1, further comprising blocking elements positioned on the same panel surface as the hot-point element to deflect particulates in the airstream from impacting the hot-point element, the blocking elements comprising surface projections that extend away from the panel surface.

7. The apparatus recited in claim 6, wherein the blocking elements are positioned upstream from the hot-point element along a leading edge of the panel.

8. The apparatus recited in claim 6, wherein the projections have the shape selected from at least one of the following: cylindrical shapes, spherical shapes, semispherical shapes, cylindrical with a semi-spherical top shapes, hillock shapes, drop shapes, airfoil shapes, elliptical shapes, and ellipsoidal shapes.

9. The apparatus recited in claim 6, wherein the blocking elements have a shape selected to minimize disturbance of the airstream.

10. The apparatus recited in claim 6, wherein the blocking elements are arranged such that the airstream cannot pass along a direct linear path through the blocking elements and across the hot-point element.

11. The apparatus recited in claim 6, wherein the blocking elements are arranged in an array comprising at least one row.

12. The apparatus recited in claim 6, wherein the blocking elements are arranged in an array comprising at least two parallel rows, wherein the rows are staggered such that blocking elements in one row are positioned between blocking elements of the adjacent rows.

13. An apparatus for measuring airflow in an airstream, the apparatus comprising:
a generally planar panel adapted to be placed in the airstream so that air passes over opposite surfaces of the panel;
a hot-point element mounted on one of the panel surfaces so that the airstream passes over the hot-point element; and
blocking elements arranged in staggered rows each of which comprise a plurality of blocking elements, the staggered rows extending adjacent a leading edge of the panel, the blocking elements being positioned on the same panel surface as the hot-point element and being configured to deflect particulates in the airstream from impacting the hot-point element, the blocking elements comprising surface projections that extend away from the panel surface.

14. The apparatus recited in claim 13, wherein the blocking elements are positioned upstream from the hot-point element along the leading edge of the panel.

15. The apparatus recited in claim 13, wherein the surface projections have the shape selected from at least one of the following: cylindrical shapes, spherical shapes, semispherical shapes, cylindrical with a semi-spherical top shapes, hillock shapes, drop shapes, airfoil shapes, elliptical shapes, and ellipsoidal shapes.

16. The apparatus recited in claim 13, wherein the blocking elements have a shape selected to minimize disturbance of the airstream.

17. The apparatus recited in claim 13, wherein the blocking elements are arranged such that the airstream cannot pass along a direct linear path through the blocking elements and across the hot-point element.

18. The apparatus recited in claim 13, wherein the blocking elements are arranged in an array comprising at least one row.

19. The apparatus recited in claim 13, wherein the blocking elements are arranged in an array comprising at least two rows, wherein the rows are staggered such that blocking elements in one row are positioned between blocking elements of the adjacent rows.

20. The apparatus recited in claim 13, wherein the panel comprises at least one slot that extends through the panel, the hot-point element being mounted on one of the panel surfaces adjacent the at least one slot, the at least one slot being configured to permit air passing over the opposite surfaces of the panel to pass through the slot and become mixed together, the hot-point element being positioned proximate to a trailing end of the at least one slot and spaced apart from a leading end of the at least one slot so that the mixed air passes over the hot-point element.

21. The apparatus recited in claim 13, wherein the panel is adapted to be supported in a probe, the probe being adapted to be positioned in the airstream.

22. The apparatus recited in claim 21, wherein the probe comprises a support portion for supporting the panel, the support portion comprising portions between which the panel is sandwiched, the support portion comprising one or more apertures in which the hot-point element is positioned and through which air passes through and over the opposite surfaces of the panel.

23. The apparatus recited in claim 22, wherein the probe has an elongated tubular configuration, and the support portion comprises an end portion of the probe.

24. A method for manufacturing an apparatus for measuring airflow in an airstream, the method comprising the steps of:
providing a generally planar panel adapted to be placed in the airstream so that air passes over opposite surfaces of the panel, the panel comprising a printed circuit board (PCB);
providing a pair of slots that extend through the panel, the pair of slots being spaced from each other and extending parallel to each other, each slot of the pair of slots being elongated and having a leading end and an opposite trailing end, the pair of slots defining a strip that extends between the pair of slots, the pair of slots being configured to permit air passing over the opposite surfaces to pass through the pair of slots and become mixed together;
providing surface mount solder pads on the strip adjacent the pair of slots, the surface mount solder pads being positioned along lengths of the pair of slots proximate to the trailing ends of the pair of slots and distal from the leading ends of the pair of slots; and
surface mounting a hot-point element on the solder pads so that the hot-point element is in a position along the lengths of the pair of slots proximate to the trailing ends of the pair of slots and distal from the leading ends of the pair of slots so that the mixed air passes over the hot-point element, the hot-point element being configured to measure the airflow in a direction parallel to lengths of the pair of slots.

25. The method recited in claim 24, further comprising the step of providing at least one of a chamfer and a bevel on a leading edge of the panel to split the airstream to flow over the opposite surfaces of the panel while helping to minimize turbulence resulting from the split airstream.

26. The method recited in claim 24, further comprising the step of providing blocking elements on the PCB for deflecting particulates in the airstream from impacting the hot-point element.

27. The method recited in claim 26, wherein the step of providing blocking elements comprises positioning the blocking elements upstream from the hot-point element along the leading edge of the panel.

28. The method recited in claim 26, wherein the step of providing blocking elements comprises arranging the blocking elements such that the airstream cannot pass along a direct linear path through the blocking elements and across the hot-point element.

29. The method recited in claim 26, wherein the step of providing blocking elements comprises arranging the blocking elements in an array comprising at least one row, wherein arrays comprising at least two rows comprises staggering the rows such that blocking elements in one row are positioned between blocking elements of the adjacent rows.

30. A method for manufacturing an apparatus for measuring airflow in an airstream, the method comprising the steps of:
providing a generally planar panel adapted to be placed in the airstream so that air passes over opposite surfaces of the panel, the panel comprising a printed circuit board (PCB);
providing surface mount solder pads on one of the opposite surfaces on the PCB;
surface mounting a hot-point element on the solder pads so that the airstream passes over the hot-point element;
providing blocking elements on the same PCB surface as the hot-point element, the blocking elements comprising surface projections that extend away from the PCB surface and configured to deflect particulates in the airstream from impacting the hot-point element; and
arranging the blocking elements in staggered rows each of which comprise a plurality of blocking elements, the staggered rows extending adjacent a leading edge of the PCB.

31. The method recited in claim 30, further comprising the steps of:
providing at least one slot that extends through the PCB;
mounting the hot-point element on the PCB adjacent the at least one slot, the at least one slot being configured to permit air passing over the opposite surfaces of the PCB to pass through the at least one slot and become mixed together; and
positioning the hot-point element on the PCB so that the mixed air passes over the hot-point element.

\* \* \* \* \*